(12) United States Patent
Long et al.

(10) Patent No.: US 12,157,198 B2
(45) Date of Patent: Dec. 3, 2024

(54) ASSEMBLING EQUIPMENT

(71) Applicant: Fulian Yuzhan Precision Technology Co., Ltd., Shenzhen (CN)

(72) Inventors: Bo Long, Shenzhen (CN); Shui-Yun Huang, Shenzhen (CN); Zhi Wang, Shenzhen (CN); Ge Zhao, Shenzhen (CN)

(73) Assignee: Fulian Yuzhan Precision Technology Co., Ltd., Shenzhen (CN)

( * ) Notice: Subject to any disclaimer, the term of this patent is extended or adjusted under 35 U.S.C. 154(b) by 115 days.

(21) Appl. No.: 18/115,637

(22) Filed: Feb. 28, 2023

(65) Prior Publication Data

US 2023/0271288 A1 Aug. 31, 2023

(30) Foreign Application Priority Data

Feb. 28, 2022 (CN) .......................... 202210190088.2

(51) Int. Cl.
| | |
|---|---|
| *B23Q 3/16* | (2006.01) |
| *B23Q 3/06* | (2006.01) |
| *B23Q 7/02* | (2006.01) |
| *B23Q 7/14* | (2006.01) |
| *B23Q 7/18* | (2006.01) |

(52) U.S. Cl.
CPC ................ *B23Q 7/02* (2013.01); *B23Q 3/06* (2013.01); *B23Q 3/16* (2013.01); *B23Q 7/1405* (2013.01); *B23Q 7/1478* (2013.01); *B23Q 7/18* (2013.01); *B23Q 2220/004* (2013.01); *B23Q 2703/02* (2013.01)

(58) Field of Classification Search
CPC ... B23Q 3/03; B23Q 3/16; B23Q 7/02; B23Q 7/1405; B23Q 7/1478; B23Q 7/18; B23Q 2703/02
USPC ............................................... 198/345.1, 346
See application file for complete search history.

(56) References Cited

U.S. PATENT DOCUMENTS

| | | | |
|---|---|---|---|
| 9,956,622 B2 * | 5/2018 | Heidlmayer | ........... B23Q 3/088 |
| 10,180,070 B2 * | 1/2019 | Chauvin | ................. F01D 5/147 |

OTHER PUBLICATIONS

US 2012/0325275 A1, Goodman et al., Dec. 27, 2012.*

(Continued)

*Primary Examiner* — Douglas A Hess
(74) *Attorney, Agent, or Firm* — ScienBiziP, P.C.

(57) ABSTRACT

An assembling equipment is for attaching a component to a workpiece. The assembling equipment includes a platform, a conveying mechanism, a first attaching mechanism, a film removing mechanism, and a second attaching mechanism. The conveying mechanism transports a positioning assembly carrying a workpiece to a first station. The first attaching mechanism attaches a first component with a protective film to the workpiece at the first station. The conveying mechanism transports the positioning assembly to a second station, and the film removing mechanism at the second station removes the protective film from the workpiece. The conveying mechanism transports the positioning assembly to a third station. The second attaching mechanism at the third station attaches a second component to the first component on the workpiece to be connected together. The assembling equipment reduces manual labor intensity and labor costs and improves efficiency of production and the product quality.

19 Claims, 6 Drawing Sheets

(56) References Cited

OTHER PUBLICATIONS

US 2017/0292584 A1, Kawata et al., Oct. 12, 2017.*
US 2019/0247968 A1, Tsukamoto et al., Aug. 15, 2019.*
US 2023/0014205 A1, Kim et al., Jan. 19, 2023.*
US 2023/0271287 A1, Long et al., Aug. 31, 2023.*
US 2023/0381866 A1, Harnickell et al., Nov. 30, 2024.*
US 2024/0165758 A1, Park et al., May 23, 2024.*

* cited by examiner

ASSEMBLING EQUIPMENT

CROSS-REFERENCE TO RELATED APPLICATION

This application claims priority to China Application No. 202210190088.2, having a filing date of Feb. 28, 2022, filed in China State Intellectual Property Administration, the entire contents of which are hereby incorporate by reference.

FIELD

The subject matter relates to the field of assembling technologies, and more particularly, relates to an assembling equipment.

BACKGROUND

In production process of electronic products, a manual mean of assembling is usually applied to attach a part of small size on a predetermined area of another workpiece. The small size of the part results in difficult manual operation, high manual labor intensity, and high labor cost, while causing low efficiency, poor consistency of the workpiece after placement, and low product quality.

Therefore, there is room for improvement within the art.

SUMMARY

An objective of the present disclosure is achieved by providing an assembling equipment, the assembling equipment includes a platform, a conveying mechanism, a first attaching mechanism, a film removing mechanism, and a second attaching mechanism. The conveying mechanism is arranged on the platform, a positioning assembly is connected to the conveying mechanism, the conveying mechanism moves the positioning assembly to a first station, a second station and a third station in said sequence, the positioning assembly is configured for positioning a workpiece. The first attaching mechanism is arranged at the first station, the first attaching mechanism is configured for picking up a first component with a protective film and attaching the first component to the workpiece carried by the positioning assembly after the positioning assembly arrived the first station. The film removing mechanism arranged at the second station, the film removing mechanism is configured for removing the protective film from the workpiece after the positioning assembly is moved to the second station. The second attaching mechanism is arranged at the third station, the second attaching mechanism is configured for picking up a second component and attaching the second component to the first component on the workpiece to be connected together after the positioning assembly is moved to the third station.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The term "comprising," when utilized, means "including, but not necessarily limited to"; it specifically indicates open-ended inclusion or membership in the so-described combination, group, series, and the like.

A description of the hereinafter described embodiments of the disclosure is presented herein with reference to the figures by way of exemplification and not as a limitation.

An assembling equipment is provided for reducing manual labor intensity and high labor cost, while improving efficiency and product quality.

Figure 1:
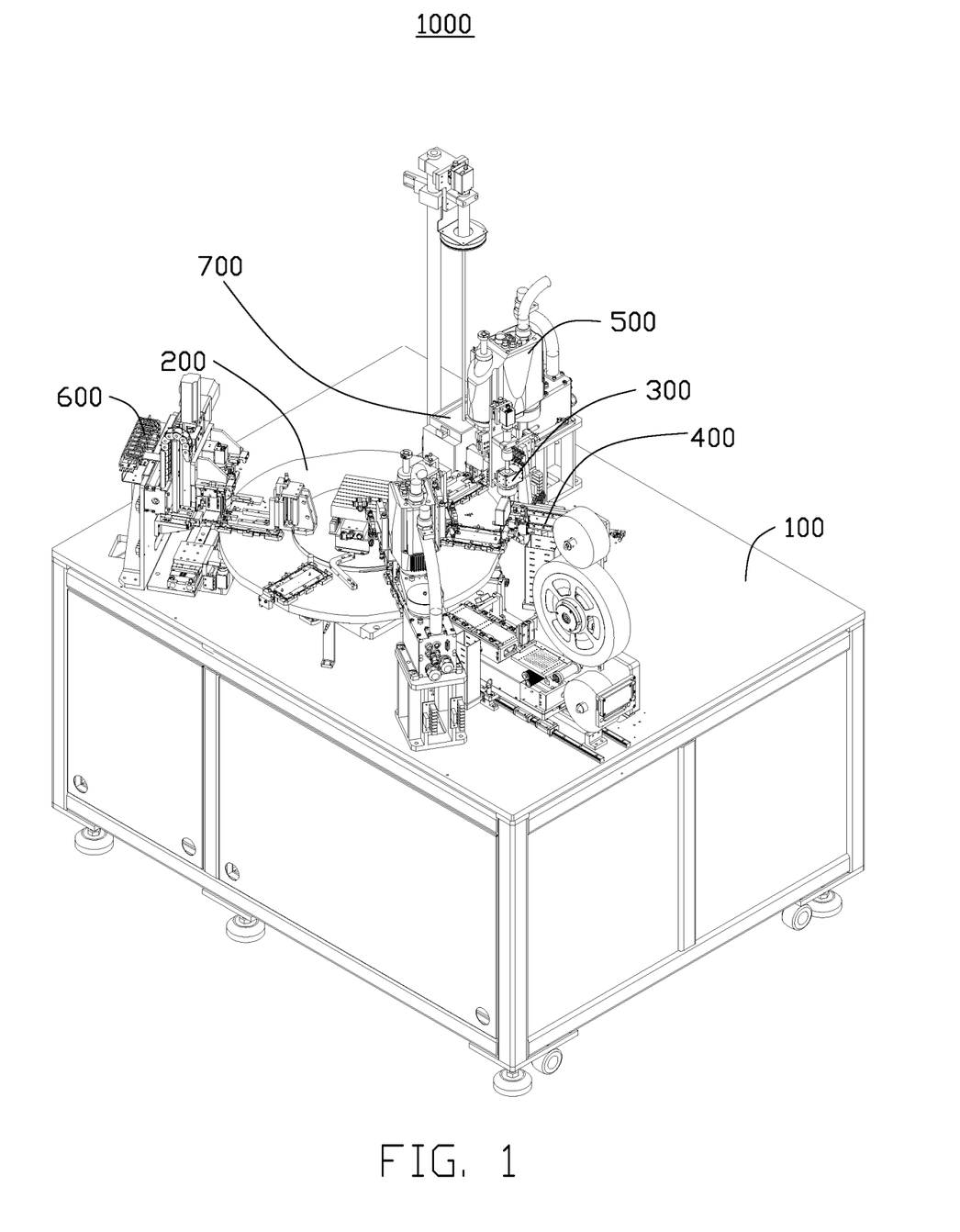
FIG. 1 is a perspective view of an assembling equipment according to an embodiment of the present disclosure.
Figure 2:
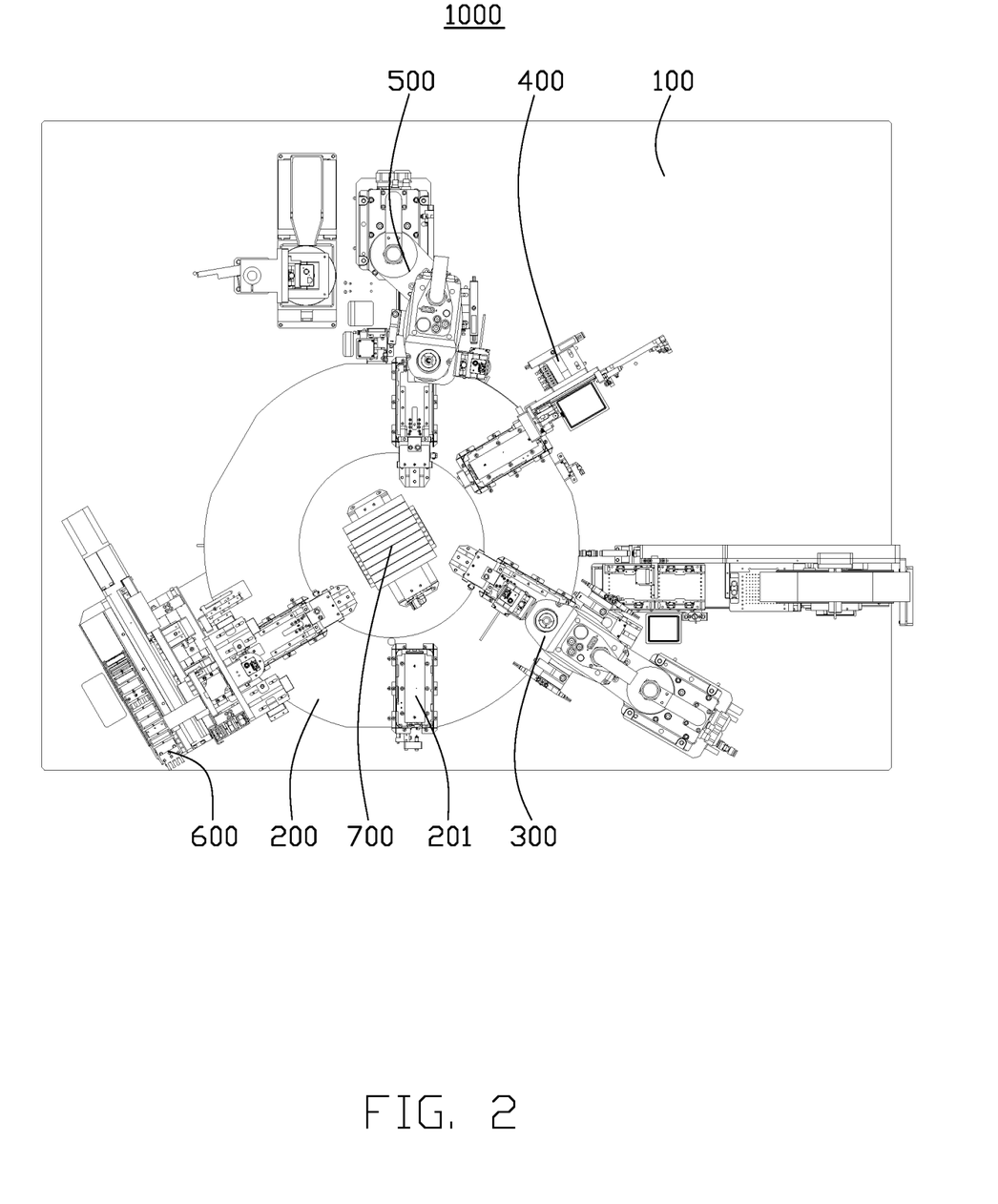
FIG. 2 is a top view of the assembling equipment in FIG. 1.

Referring to FIG. 1 and FIG. 2, an assembling equipment 1000 is provided, the assembling equipment includes a platform 100, a conveying mechanism 200, a first attaching mechanism 300, a film removing mechanism 400, and a second attaching mechanism 500. Specifically, the conveying mechanism 200 is mounted on the platform 100, the conveying mechanism 200 is connected to a positioning assembly 201, the positioning assembly 201 is configured for positioning a workpiece. The conveying mechanism 200 is configured for moving the positioning assembly 201 to a first station, a second station and a third station. The first attaching mechanism 300 is arranged at the first station, and the first attaching mechanism 300 is configured for picking up and attaching a first component with a protective film to the workpiece when the positioning assembly 201 is moved to the first station. The film removing mechanism 400 is arranged at the second station, and the film removing mechanism 400 is configured for removing the protective film from the first component when the positioning assembly 201 is moved to the second station. The second attaching mechanism 500 is arranged at the third station, and the second attaching mechanism 500 is configured for picking up a second component and attaching the second component to the first component on the workpiece to be connected together after the positioning assembly 201 is moved to the third station.

In operation, the conveying mechanism 200 moves the positioning assembly 201 to the first station, and the first attaching mechanism 300 picks up the first component and attaches the first component to the workpiece, the first component is attached to the workpiece, the protective film is located at a side of the first component away from the workpiece. Then the conveying mechanism 200 moves the positioning assembly 201 to the second station, and the film removing mechanism 400 removes the protective film from the first component, such that only the first component is retained on the workpiece. Then the conveying mechanism 200 moves the positioning assembly 201 to the third station, and the second attaching mechanism 500 picks up the second component and attaches the second component to the workpiece by the first component.

According to further embodiments, the first component is a first component, the protective film is located at one side of the first component, and the workpiece is connected to the first component at the other side of the first component.

Therefore, the first attaching mechanism 300 and the second attaching mechanism 500 can attach the first component and the second component to the workpiece automatically, the film removing mechanism 400 can remove the protective film automatically, such that the second component can be attached to the workpiece automatically, which avoids manual operation, and reduces manual labor intensity and labor costs. In addition, the automatic attaching process eliminates poor consistency due to manual operation, improves the product quality, and facilities production in large batches. Further, the automatic process has high efficiency.

It should be noted that, in this embodiment, a number of the positioning assembly 201 is not limited. For example, as shown in FIG. 1 and FIG. 2, more than one positioning assembly 201 can be arranged, and the positioning assemblies 201 can be moved to different stations synchronously, such that the first attaching mechanism 300, the film removing mechanism 400, and the second attaching mechanism 500 can operate synchronously. That is, the workpiece on different positioning assembly 201 can be processed at the same time, for improving the production efficiency.

This application embodiment does not limit the specific structure of the conveying device 200, as long as it can drive the positioning assembly 201 to move to the first station, the second station and the third station in turn.

According to some embodiments, referring to FIG. 1, the conveying mechanism 200 is a circular rotating mechanism 200, the conveying mechanism 200 includes a rotating platform can be positioned at the first station and the second station. The positioning assembly 201 is arranged on the rotary platform, the first attaching mechanism 300, the second attaching mechanism 400, and the film removing mechanism 500 are arranged beside the rotary platform. In operation, by rotating the rotary platform, the positioning assembly 201 can be move to the first station, the second station, and the third station. The conveying mechanism 200 has a compact structure occupying a small area, and the positioning assembly 201 and the second positioning assembly 202 can be recycled, which reduces the cost.

According to some embodiments, the first component includes a first attaching member, the first attaching mechanism 300 includes a first transfer assembly and a first detection assembly, the first transfer assembly is configured for picking up the first component and moving the first component between a first position and a second position. The first transfer assembly picks up the first component at the first position and attaches the first component to the workpiece or removes the first component from the workpiece at the second position. The first detection assembly is configured for detecting a pose of the workpiece. The assembling equipment 1000 further includes a control device 700, the control device 700 is coupled to the first transfer assembly, the first detection assembly, and the positioning assembly. The control device 700 is configured for controlling the first transfer assembly to adjust the pose of the first component or controlling the positioning assembly 201 to adjust the pose of the workpiece according to the pose detected by the first detection assembly, thus the first transfer assembly can attach the first component to the workpiece.

In operation, the conveying mechanism 200 moves the positioning assembly 201 to the first station, the first detection assembly detects the pose of the workpiece, then the control device 700 controls the first transfer assembly to adjust the pose of the first component or controls the positioning assembly 201 to adjust the pose of the workpiece according to the pose of the workpiece, such that the pose of the first component is matched with the pose of the workpiece, and the first transfer assembly attaches the first component to the workpiece accurately. The first detection assembly improves the accuracy of attaching the first component to the workpiece.

It should be noted that, in this embodiment, the pose of the workpiece refers to a position, an angle, and a shape of the workpiece. In this embodiment, detecting the pose of the workpiece refers to detecting the position of the workpiece, the angle of the workpiece relative to a plane, the shape and height of the workpiece. The first detection assembly may be a photographing device, the photographing device is used to capture an image of the workpiece at the second position and acquire the pose according to the image.

Figure 6:
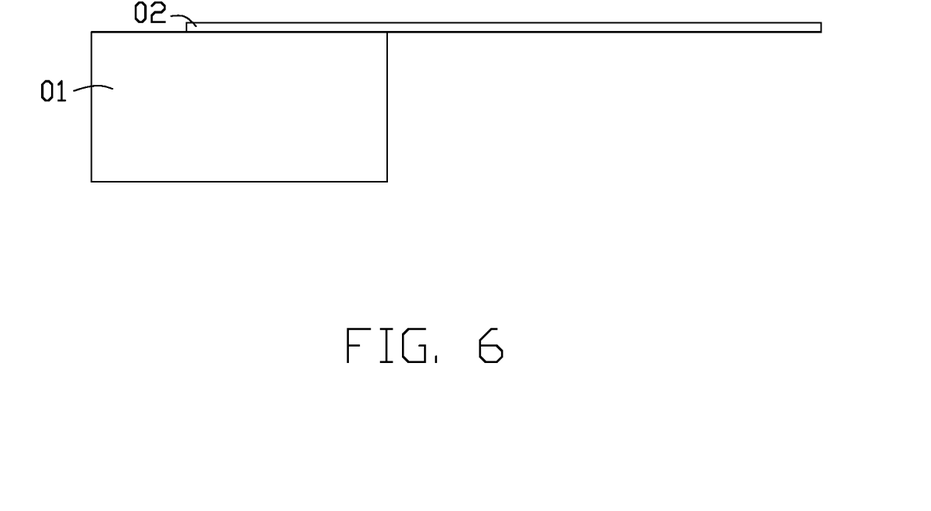
FIG. 6 is a location schematic view of a protective film and an attaching portion of a workpiece.

It should be noted that, referring to FIG. 6, the first component includes a protective film and a glue layer, the glue layer is arranged on one side of the protective film, and the glue layer covers part of the one side of the protective film, such that the protective film is adhered to the workpiece 01 at the part, and the rest part of the protective film 02 protrudes from outer periphery of the workpiece 01.

According to some embodiments, the first transfer assembly may be a robot arranged beside the conveying mechanism 200, the robot has an end for picking up the first attaching member. The first assembly may be a multiple degrees of freedom module in further embodiments.

Figure 3:
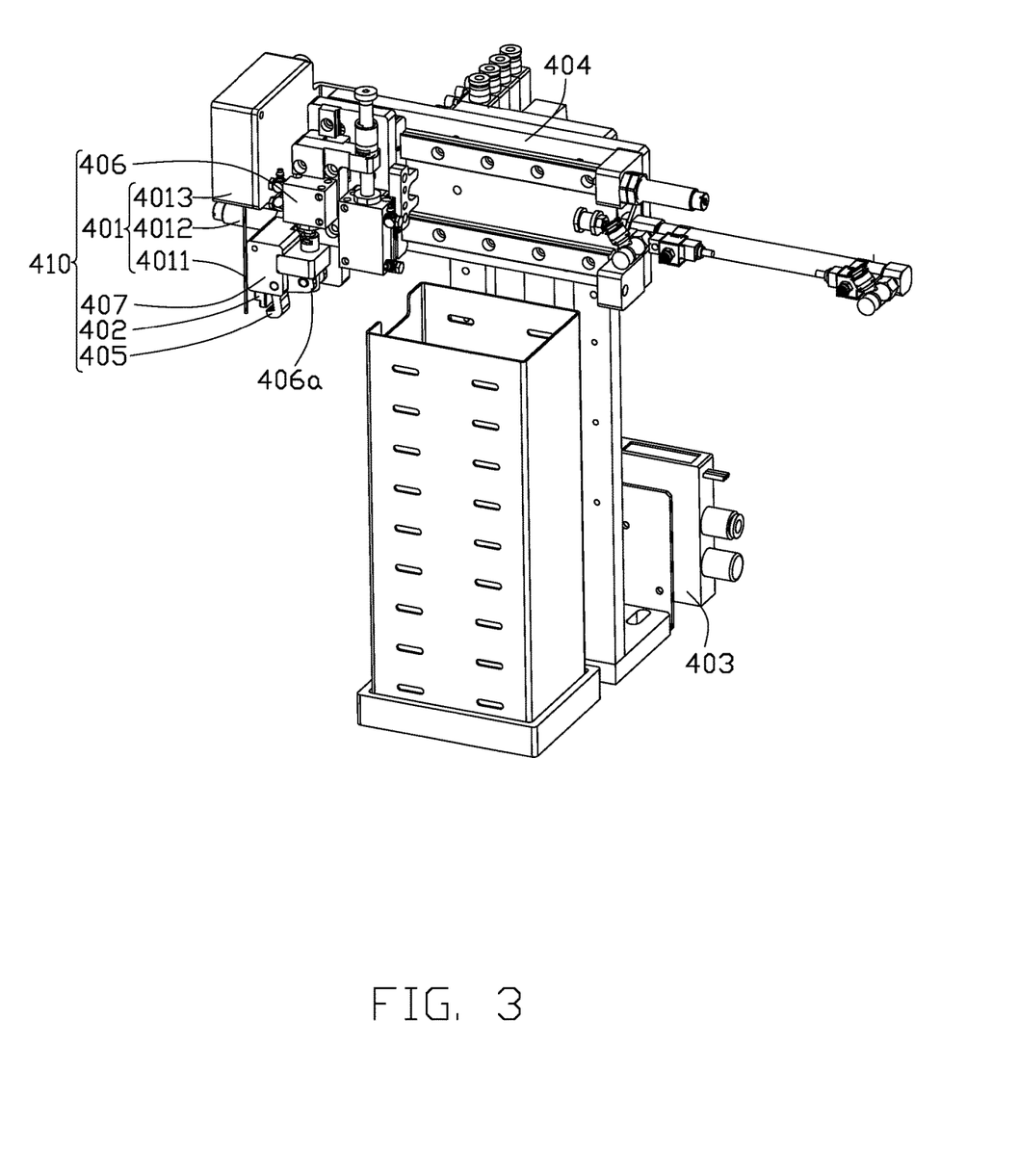
FIG. 3 is a perspective view of a film removing mechanism of the assembling equipment in FIG. 1.

Referring to FIG. 3, according to some embodiments, the film removing mechanism 400 includes a detection assembly 401, a suction nozzle 402, and a movable assembly 404. For the sake of illustration, the suction nozzle 402 here is described as the first suction nozzle 402. The detection assembly 401 is configured for acquiring position information of the protective film, the position information includes height of the protective film or an attaching portion of the workpiece, the attaching portion of the workpiece refers to a portion that the glue layer is attached to the workpiece. The first suction nozzle 402 is configured for sucking the first component on the protective film. The movable assembly 404 is configured for moving the first suction nozzle 402 towards or away from the workpiece. The assembling equipment 1000 further includes a control device 700, the control device 700 is coupled to the detection assembly, the movable assembly 404, and the first suction nozzle 402. The control device 700 is configured for controlling the movable assembly 404 to move the first suction nozzle 402 according to the height of the protective film, such that the protective film can be separated from the workpiece when being sucked.

For the sake of illustration, the detection assembly 401 here is described as the second detection assembly 401.

In operation, the second detection assembly 401 acquires the position information of the protective film, the position information includes the height of the protective film or the attaching portion. Then the second detection assembly 401 sends the position information to the control device 700, and the control device 700 controls the movable assembly 404 to move the first suction nozzle 402 to a position for removing the protective film according to the position information, such that the first suction nozzle 402 can contact the protective film or be close enough to the protective film to adsorb the protective film by sucking. The control device 700 controls the first suction nozzle 402 to adsorb the protective film by sucking, and the control device controls the movable assembly 404 to move the first suction nozzle 402 away from the workpiece, the protective film will be removed from the glue layer of the first component as the absorption force between the first suction nozzle 402 and the protective film is greater than the adhesive force between the protective film and the glue layer.

Therefore, the film removing mechanism 400 realizes an automatic film removing process, improves the efficiency of the film removing process, and reduces the labor cost of the film removing process. Further, the position information of the protective film is acquired before performing the film removing process, and the first suction nozzle 402 is moved according to the position information, which improves accuracy of the adsorbing process performed by the first suction nozzle 402, avoids the adsorption force being insufficient or the first suction nozzle 402 crushing the protective film or the workpiece, improves the efficiency of the film removing process. Further, during the film removing process, the first suction nozzle 402 can adsorb protective film that being soft or flexible, avoiding the bending and deformation of the protective film affecting the adsorbing process, and improving the reliability of the film removing mechanism 400.

It should be noted that, the second detection assembly 401 can detect only the height of the protective film or the attaching portion, but also the position of the protective film or the attaching portion in other directions at the same time, depending on the actual situation.

The first suction nozzle 402 mainly adsorbs the protective film through negative pressure, and a shape and size of the first suction nozzle 402 can be determined according to the actual situation. As shown in FIG. 3, the first suction nozzle 402 is connected to a vacuum generator 403, and the vacuum generator 403 is connected to the control device 700. The first suction nozzle 402 and the vacuum generator 403 are combined to form a first suction nozzle 402 assembly. In operation, the vacuum generator 403 can be controlled to provide a negative air pressure for the first suction nozzle 402, thus generating suction to adsorb the protective film; or the vacuum generator 403 can be controlled to release the negative air pressure in the first suction nozzle 402, such that the protective film is released from the first suction nozzle 402.

The movable assembly 404 can have only one or multiple degrees of freedom of movement and rotation, depending on the actual situation.

Referring to FIG. 3, according to some embodiments, the film removing mechanism 400 includes a clamp assembly 410 connected to the movable assembly 404, the clamp assembly 410 includes a clamp driver 406 arranged on the movable assembly 404 and a clamp 405 connected to the clamp driver 406. The clamp driver 406 is coupled to the control device 700, and the clamp driver 406 is provided with a motion end 406a. The clamp 405 is connected to the clamp driver 406 at the motion end 406a, the clamp driver 406 drives the clamp 405 to cooperate with the first suction nozzle 402 to clamp or release the protective film. The control device 700 controls the movable assembly 404 to move the first suction nozzle 402 and the clamp 405, such that the protective film can be separated from the workpiece when being sucked and clamped.

In the process of adsorbing the protective film, if the clamp 405 is not used, the protective film is adsorbed by the first suction nozzle 402 and driven to move away from the workpiece, during the process of adsorbing or moving after adsorbing, the protective film will be likely to detach from the first suction nozzle 402 or the first suction nozzle 402 will be likely to slip along the protective film, which will affect the removing of the protective film. The clamp assembly 410 can clamp the protective film to assist the first suction nozzle 402, which can improve the reliability of the protective film being adsorbed, avoid the detachment of the protective film from the first suction nozzle 402 in the process of removing the protective film, and improve the successful rate of removing the protective film compared to using only the first suction nozzle 402.

In this embodiment, the clamp driver 406 may be a cylinder, an electric cylinder, a motor or any other power apparatus, the clamp 405 may be multiple clamp heads capable of opening and clamping, the multiple clamp heads cooperate with each other in the closed state to clamp the protective film. In further embodiments, the clamp 405 may be a single clamp head, the clamp head cooperates with the first suction nozzle 402 in the process of moving or rotating to clamp the protective film. In further embodiments, the clamp 405 may be other structure capable of clamping the protective film, which will not be described here.

It should be noted that the first suction nozzle 402 and the drive member 406 can be driven by the same movable assembly 404, or by different mobile assemblies respectively, depending on the actual situation.

Figure 4:
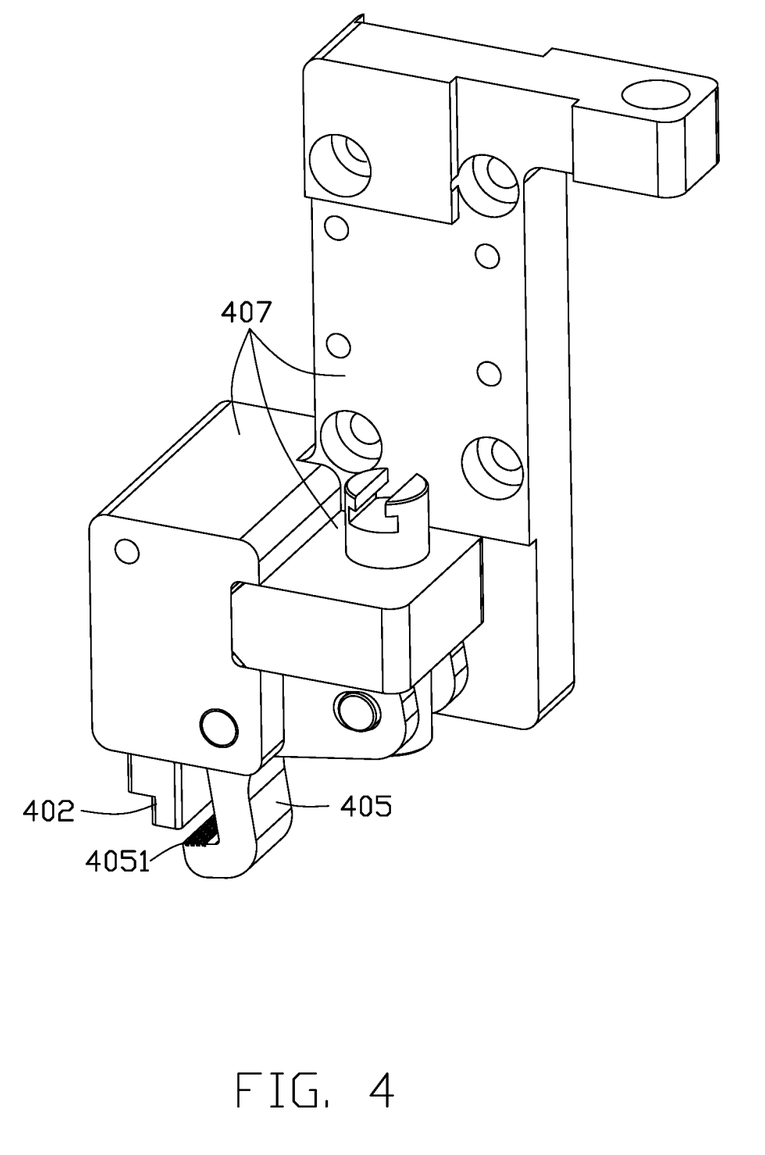
FIG. 4 is a partially schematic view of the film removing mechanism in FIG. 3.

According to some embodiments, referring to FIG. 3 and FIG. 4, the clamp driver 406 may be a cylinder, the first suction nozzle 402 and the clamp driver 406 are both mounted on a mounting plate 407. The clamp 405 is connected to the clamp driver 406 at the motion end 406a, and the clamp 405 is pivotally mounted to the mounting plate 407. The motion end 406a moves to pivot the clamp 405 relative to the mounting plate 407. The mounting plate 407 in FIG. 3 is shown as multiple plate structures spliced together. In operation, the motion end 406a extends to push the clamp 405, the clamp 405 pivots towards the first suction 402 to cooperate with the first suction 402 to clamp the protective film. The motion end 406a retracts, and the clamp 405 pivots backwards from the first suction 402 to release the protective film or allow the protective film to enter between the first suction 402 and the clamp 405.

It should be noted that, according to further embodiments, the clamp 405 may be movably mounted on the mounting plate 407, and the first suction nozzle 402 is fixed on the mounting plate. The motion driver 406 can move the clamp 405 relative to the mounting plate 407 to cooperate with the first suction 402 to clamp the protective film, and the motion driver 406 can move the clamp 405 away from the first suction 402 to release the protective film or allow the protective film to enter between the first suction 402 and the clamp 405. The clamp 405 may move along a vertical direction, a lateral direction or any other suitable direction relative to the mounting plate 407, which is not limited here.

Referring to FIG. 4, according to some embodiments, in order to improve the clamping force of the clamp 405 and avoid the protective film from dislodging or slipping relative to the clamp 405 when the first suction nozzle 402 and the clamp 405 clamping the protective film, an anti-slip structure 4051 is provided on a surface of the clamps 405 for clamping the protective film to improve the friction between the clamps 405 and the protective film. The anti-slip structure 4051 can be a pattern of lug grooves, a diamond pattern, an irregular pattern or any other shapes of pattern capable of providing the anti-slip function. In further embodiment, a pad-like structure may be provided, the pad-like structure is made of material with a large surface friction coefficient such as rubber, depending on the actual situation.

In some embodiments, the second detection assembly 401 includes a height detector 4011 coupled to the control device 700 for obtaining the height position of the protective film, the height detector 4011 is located near the first suction nozzle 402. The control device 700 is also used to control the movable assembly 404 to drive the first suction nozzle 402 towards the workpiece according to the height position of the protective film.

The height detector 4011 can be a laser ranging device or other apparatus that meets the requirements. In operation, in order to avoid the first suction nozzle 402 from affecting the measurement of the height detector 4011, the height detector 4011 can be set on one side of the first suction nozzle 402, and when the height detector is a laser ranging device, such arrangement can avoid the first suction nozzle 402 from being located in the laser projection path and affecting the measurement of the height position of the protective film.

The height detector 4011 can be fixed on a working table or the movable assembly 404, depending on the actual situation.

According to some embodiments, the position includes a planar position, and the second detection assembly 401 also includes a visual detector 4012 coupled to the control device 700 for obtaining the planar position of the protective film. The control device 700 is also used to control the movable assembly 404 to drive the first suction nozzle 402 according to the height position of the protective film and the planar position of the protective film, to separate the protective film from the workpiece when the protective film is adsorbed.

The visual detector 4012 may be a camera or other adequate apparatus such as a shooting camera. The vision detector 4012 can be fixed on the working table or the movable assembly 404, depending on the actual situation.

In this embodiment, the visual detector 4012 captures an image of the location of the protective film and sends the image information to the control device 700. The control device 700 obtains the plane position of the protective film based on the image, controls the first suction nozzle 402 to move to a position where the protective film can be adsorbed according to the plane position and the above-mentioned height position of the protective film, and controls the first suction nozzle 402 to adsorb the protective film. Then the movable assembly 404 is controlled to move the first suction nozzle 402 with the protective film adsorbed in a direction away from the workpiece to separate the protective film from the workpiece when the protective film is adsorbed.

The film removing device 400 in this embodiment improves the adsorption accuracy of the first suction nozzle 402, which effectively avoid a collision between the first suction nozzle 402 and the workpiece during the moving process.

According to some embodiments, the position also includes planar position. The second detection assembly 401 includes a sensor 4013 coupled to the control device 700 for obtaining conveying information of the conveying mechanism 200. The control device 700 is used to control the movable assembly 404 to drive the first suction nozzle 402 according to the height position of the protective film and the conveying information, to separate the protective film from the workpiece when the protective film is adsorbed.

The sensor 4013 can be a apparatus such as an alignment sensor, a photoelectric sensor, a cavity sensor, etc. for sensing the conveying information of the conveying device 200 to obtain the distance the workpiece is conveyed and the conveying position of the workpiece.

In operation, the sensor 4013 acquires the conveying information of the conveying mechanism 200, the control device 700 controls the movable assembly 404 to drive the first suction nozzle 402 towards the workpiece to suck the protective film according to the height position of the protective film and the conveying information, and the control device 700 controls the movable assembly 404 to drive the first suction nozzle 402 with the protective film away from the workpiece to separate the protective film from the workpiece when the protective film is adsorbed.

In actual use, the position accuracy of the workpiece can be controlled by controlling the conveying accuracy of the conveying mechanism 200 and the sensing accuracy of the sensor 4013, the first suction nozzle 402 is controlled to adsorb the protective film located on the workpiece, and the adsorption accuracy of the first suction nozzle 402 can be improved. According to some embodiments, when the first suction nozzle 402 adsorbs on one side of the protective film and the adsorption position corresponds to the attaching portion on the workpiece, the clamp 405 can be a plurality of clamp heads that can be opened and closed, and the plurality of clamp heads can cooperate with each other to clamp the protective film in the closed state, and in the clamped state, some of the clamp heads are located on one side of the protective film and the other of the clamp heads are located on the other side of the protective film. When the first suction nozzle 402 is adsorbed on one side of the protective film and the suction position does not correspond to the position in the protective film where it is attached to the workpiece, the clamp 405 can be located on the other side of the protective film, and the contact position of the clamp 405 with the protective film corresponds to the position where the first suction nozzle 402 is adsorbed on the protective film. When the first suction nozzle 402 is adsorbed on the other side of the protective film and the suction position is located on the other side of the protective film where it is not attached to the workpiece, the clamp 405 can be located on one side of the protective film, and the contact position of the clamp 405 with the protective film corresponds to the position of the first suction nozzle 402 adsorbed on the protective film. The first suction nozzle 402 and the clamps 405 can be controlled separately, or the first suction nozzle 402 and the clamps 405 can be controlled to move simultaneously, depending on the actual situation. By using the first suction nozzle 402 to adsorb the protective film while using the clamp assembly to clamp the protective film, accidental separation of the protective film from the film removing mechanism 400 can be effectively avoid during the process of removing the protective film and the success rate of removing the protective film can be improved.

Figure 5:
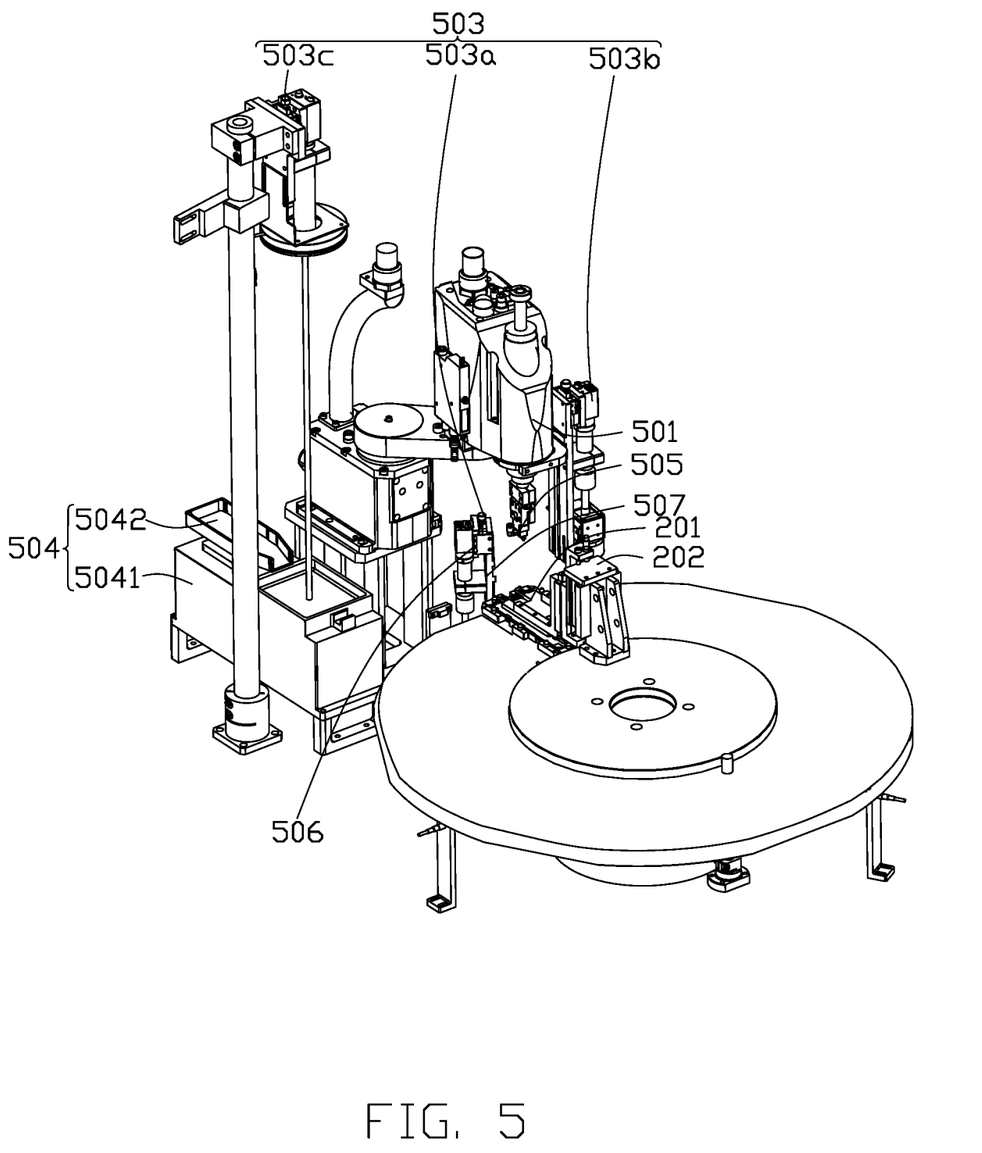
FIG. 5 is a perspective view of a second attaching mechanism of the assembling equipment in FIG. 1.

Referring to FIG. 5, according to some embodiments, the second attaching mechanism 500 includes a transfer assembly 501 and an another detection assembly 503, for the sake of illustration, the another detection assembly 503 here is described as a third detection assembly 503, the transfer assembly 501 is described as a second transfer assembly 501. The second transfer assembly 501 is configured for picking up a second component and moving the second component between a third position and a fourth position.

The second transfer assembly 501 picks up the second component at the third position, and the second transfer assembly 501 attaches the second component to the workpiece or removes the second component from the workpiece at the fourth position. The third detection assembly 503 is configured for detecting a pose of the glue layer. The assembling equipment 1000 further includes a control device 700, the control device 700 is coupled to the second transfer assembly and the third detection assembly. The control device 700 is configured for controlling the second transfer assembly 501 to adjust the pose of the second component or controlling the positioning assembly 201 to adjust the pose of the glue layer according to the pose detected by the third detection assembly 503, thus the second transfer assembly 501 attaches the second component to the workpiece at a portion corresponds to the glue layer.

Figure 7:
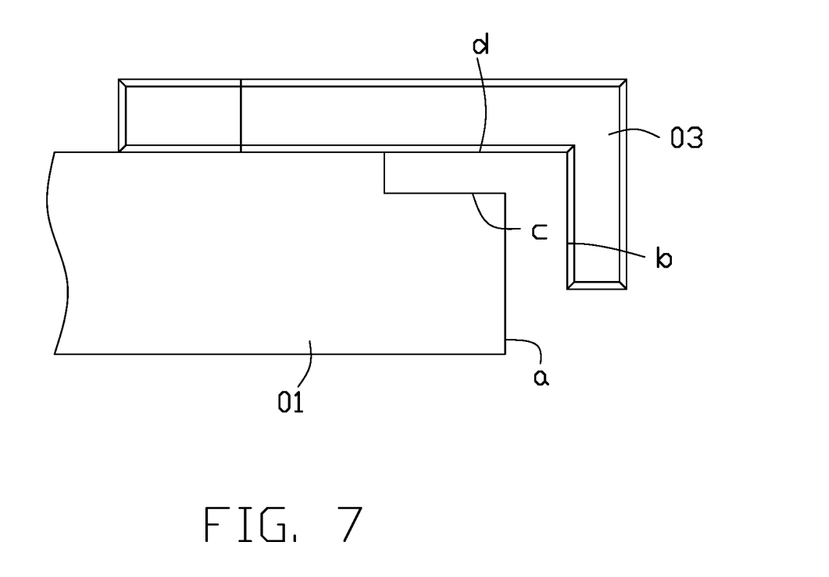
FIG. 7 is a schematic view of a second component attached to a workpiece.

In this embodiment, the second component may be a precision part with a small size, or any other suitable member. Referring to FIGS. 7, the second component is shown as a part 03, the part 03 is L-shaped. During the attaching process, a fourth surface d of the L-shaped part 03 is in contact with the workpiece 01, a second surface b of the second component 03 is parallel to a first surface a of the workpiece 01, and a gap is defined between the second surface b of the second component 03 and the first surface a of the workpiece 01. The gap between the fourth d of the second component 03 and the third surface c of the workpiece 01 avoids a deflection of the second component 03 in the process of attaching.

The third detection assembly may be a shooting member configured for acquiring an image of the workpiece at the fourth position, and the third detection assembly can acquire a pose of the glue layer according to the image. It should be noted that, the pose of the glue layer refers to a position, an angle, and a shape of the glue layer.

In operation, the positioning assembly 201 arrives the third station, the third detection assembly detects the pose of the glue layer and sends the pose to the control device 700, the control device 700 controls the second transfer assembly to adjust the pose of the second component, or the control device 700 controls the positioning assembly 201 to adjust the pose of the workpiece according to the pose of the glue layer, such that the second component carried by the second transfer assembly is attached to the workpiece correctly.

According to further embodiments, the positioning assembly 201 is provided with a fixture 202, if the pose of the second component is unmatched with the workpiece, the positioning assembly 201 or the fixture 202 can be controlled to move, pivot, or rotate, until the pose of the second component is matched with the workpiece, and the positioning assembly 201 or the fixture 202 can be controlled to move towards the second component to attach the second component to the workpiece.

According to further embodiments, referring to FIG. 5, the third detection assembly 503 includes a first photographing device 503a and a second photographing device 503b coupled to the control device 700. The first photographing device 503a is arranged at a side of the glue layer on the workpiece away from the positioning assembly 201. The first photographing device 503a is configured for acquiring a first image of the second component and the glue layer on the workpiece at the fourth position. The second photographing device 503b is arranged at a side of the glue layer on the workpiece near the positioning assembly 201. The second photographing device 503b is configured for acquiring a second image of the second component and the glue layer on the workpiece at the fourth position. The control device 700 controls the second transfer assembly to adjust the pose of the second component or controls the positioning assembly 201 to adjust the pose of the glue layer according to the first image and the second image.

It should be noted that, the first photographing device 503a is arranged at a side of the glue layer on the workpiece away from the positioning assembly 201, the second photographing device 503b is arranged at a side of the glue layer on the workpiece near the positioning assembly 201, in particular, when the glue layer is located at a top surface of the workpiece, the workpiece is held on a top surface of the positioning assembly 201, the first photographing device 503a will be arranged at a side of the workpiece near the glue layer, and the second photographing device 503b will be arranged at a side of the workpiece near the positioning assembly 201; when the glue layer is located at a bottom surface of the workpiece, the workpiece is held on the top surface of the positioning assembly 201, the first photographing device 503a will be arranged at a side of the workpiece near the positioning assembly 201, and the second photographing device 503b will be arranged at near the workpiece. If a relative position of the workpiece, the glue layer, and the positioning assembly 201 is changed, the position of the first photographing device 503a and the second photographing device 503b will be changed accordingly, and the first photographing device 503a and the second photographing device 503b will be arranged at both sides of the glue layer respectively, such that one of the first photographing device 503a and the second photographing device 503b acquires the first image of the glue layer at the third position or the glue layer and the second component at the third position from the side of the glue layer, and the other one of the first photographing device 503a and the second photographing device 503b acquires the second image of the glue layer at the fourth position or the glue layer and the second component at the fourth position from the other side of the glue layer.

The first photographing device 503a is configured for shooting the glue layer or the glue layer and the second component from above. Specifically, the first photographing device 503a acquires an image, the image includes the second component and the glue layer, and the position of the second component relative to the glue layer can be acquired according to the first image of the second component and the glue layer at the fourth position. Alternatively, the first photographing device 503a is configured for shooting the glue layer and the second component respectively, and the pose of the second component or the glue layer can be adjusted by analyzing the first image of the second component and the glue layer at the fourth position respectively.

Similarly, the second photographing device 503b is configured for shooting the glue layer or the glue layer and the second component from bottom. Specifically, the second photographing device 503b acquires an image, the image includes the second component and the glue layer, and the position of the second component relative to the glue layer can be acquired according to the second image of the second component and the glue layer at the fourth position. Alternatively, the second photographing device 503b is configured for shooting the glue layer and the second component respectively, and the pose of the second component or the glue layer can be adjusted by analyzing the second image of the second component and the glue layer at the fourth position respectively.

The second transfer assembly 501 is controlled to adjust the pose of the second component or controls the positioning assembly 201 to adjust the pose of the workpiece according to the first image and the second image. The process of adjusting the pose of the second component or the glue layer includes adjusting a size of the second component protrudes from the workpiece, an angle of attaching the second component to the workpiece, and a position of attaching the second component to the workpiece.

According to further embodiments, the third detection assembly 503 includes two first photographing device 503a, one of the two first photographing device 503a acquires the first image of the glue layer at the second position, and the other one of the two first photographing device 503a acquires the second image of the second component at the second position.

Referring to FIG. 5, according to some embodiments, the third detection assembly 503 includes a third photographing device 503c coupled to the control device 700. The third photographing device 503c is arranged on the second transfer assembly 501 and located at one side of the workpiece. The third photographing device 503c is configured for acquiring an image of the second component at the third position. The control device 700 controls the second transfer assembly 501 to pick up the second component according to the image of the second component at the third position.

Specifically, a feeding assembly vibrates and disperses the second components into a disorderly state, and the third photographing device 503c is used to obtain an image of the second component in the vibrating and dispersing state at the third position, and transmits the image to the control device 700. The control device 700 obtains the information of the position, shape, and pose of the second component that meets the requirements according to the image, and determines whether the second component is complete, and whether the position and pose meet the requirements. When the position and pose of the second component meet the preset requirements, the control devices 700 controls the second transfer assembly 501 to move to the third position to pick up the second component.

According to some embodiments, referring to FIG. 5, the feeding assembly is a vibration plate 504. The vibration plate 504 includes a vibrating member 5041 and a loading section 5042, and the third position is located in the loading section 5042. The vibrating member 5041 can vibrate the second component to the loading section 5042 to make the second component located in the third position, and by controlling the vibration of the vibrating member 5041, a plurality of the second components can be vibrated into a disorderly state and the plurality of second components can be located in the loading section 5042. The third photographing device 503c obtains image information of the plurality of second components in the loading section 5042, and the position of the second component that meets the requirement can be acquired according to the image information. Then the second transfer assembly 501 can be controlled to obtain the second component based on the position of the second component that meets the requirement.

According to some embodiments, referring to FIG. 5, the second transfer assembly 501 is provided with a second suction nozzle 505 at an end of the second transfer assembly 501. The second suction nozzle 505 is configured for adsorbing the second component.

Referring to FIG. 5, according to some embodiments, the second attaching mechanism 500 includes a waste drum 506. After adjusting the pose of the second component, if the pose of the second component is still unmatched with the glue layer, the second transfer assembly 501 moves the second component away from the workpiece and puts the second component in the waste drum 506.

According to some embodiments, referring to FIG. 5, the conveying mechanism 200 is provided with a lateral limit device 507 at a lateral side. The lateral limit device 507 is located on one side of the positioning assembly 201 after the positioning assembly 201 is moved to the third station. The lateral limit device 507 includes a limit plate, a limit member, a limit base, and a movable member. The limit member may be a push pin, and the push pin can extend out of the limit plate or retract back into the limit plate. The limit plate can slide relative to the limit base, and the limit base is provided with a projection to limit the travel of the limit plate. The movable member can move to push the limit plate, the movable member pushes the limit plate to the projection until the limit plate is pressed against the projection. The assembling equipment further includes a restoring spring, the restoring spring is used to restore the limit plate. One end of the restoring spring is connected to the limit plate, and the other end of the restoring spring is connected to the limit base.

According to some embodiments, the conveying mechanism 200 is used to moving the positioning assembly 201 from the third station to the fourth station. The assembling equipment 1000 further includes a pressure retaining and detecting module 600, the pressure retaining and detecting module 600 is arranged at the fourth station. The pressure retaining and detecting module 600 includes a pressure retaining module, a first detection module, and a motion module.

In operation, the pressure retaining module is used to retain the pressure of pressing the second component against the workpiece, the first detection module is used to detect the attaching of the second component. The pressure retaining module and the first detection module are both connected to the motion module, then the motion module can move the pressure retaining module along the second direction to the position corresponding to the workpiece, a lift driver moves the pressure retaining member along the first direction to press the second component against the workpiece and provide a press retaining force on the second component, effecting the press retaining on the second component. Then the lift driver moves the pressure retaining member backward from the workpiece. The motion module moves the first detection module along the second direction to the position corresponding to the workpiece, and the first detection module detects the attaching of the second component.

In this embodiment, other than traditional manual retaining pressure module and microscope rechecking, the pressure retaining and detecting module 600 can realize the function of retaining pressure and rechecking after retaining pressure, which reduces the manpower demand and manpower cost. In addition, the pressure retaining module and the first detection module are integrated, the integrated structure is compact, the space occupation is relatively small, the time cost by the rechecking is short, and the efficiency is improved.

In this embodiment, the third detection assembly detects the pose of the glue layer before the second component being attached to the workpiece at the glue layer, the pose of the second component is matched with that of the glue layer by controlling the second transfer assembly to adjust the pose of the second component or controlling the positioning assembly 201 to adjust the pose of the glue layer. Then the second component is attached to the workpiece at the glue layer accurately. The application improves the attaching accuracy of the second component to the glue layer, and ensures that the second component is attached to the workpiece accurately.

It should be noted that, in this embodiment, the pose of the glue layer refers to a position, an angle, and a shape of the glue layer. The process of adjusting the pose of the second component includes adjusting a position of the second component, a rotation angle and a tilting angle of the second component relative to a plane. The second transfer assembly can be controlled to move, pivot, rotate, or tilt the second component to adjust the pose of the second component.

It should be noted that, the process of attaching the second component to the workpiece at the glue layer includes attaching the second component completely to the workpiece and attaching part of the second component to the workpiece with the other part of the second component protrudes from the workpiece. There may be a gap defined between an edge of the second component and the workpiece after the attaching or not, or the attaching may be in other cases, depending on the actual situation.

While the invention has been described in detail with only a limited number of embodiments, it should be readily understood for the skilled in the art that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An assembling equipment comprising:
a platform comprising a first station, a second station, and a third station;
a conveying mechanism arranged on the platform;
a positioning assembly arranged on the conveying mechanism, the positioning assembly being configured for positioning a workpiece, wherein the conveying mechanism is configured for moving the positioning assembly to the first station, the second station and the third station in sequence;
a first attaching mechanism arranged at the first station, the first attaching mechanism being configured for picking up and attaching a first component with a protective film to the workpiece carried by the positioning assembly after the positioning assembly is moved to the first station;
a film removing mechanism arranged at the second station, the film removing mechanism being configured for removing the protective film from the workpiece after the positioning assembly is moved to the second station; and
a second attaching mechanism arranged at the third station, the second attaching mechanism being configured for picking up and attaching a second component to the first component on the workpiece to be connected together after the positioning assembly is moved to the third station.

2. The assembling equipment of claim 1, wherein the film removing mechanism comprises:
a detection assembly configured for acquiring a position information of the protective film on the first component;
a suction nozzle configured for sucking the protective film on the first component; and
a movable assembly connected to the suction nozzle, the movable assembly being configured for driving the suction nozzle to move towards or away from the workpiece.

3. The assembling equipment of claim 2, wherein the position information comprises a height of the film and/or a height of an attaching portion on the workpiece, the attaching portion on the workpiece being a portion that the first component is attached to the workpiece.

4. The assembling equipment of claim 3, wherein the position information comprises a planar position of the protective film on the first component.

5. The assembling equipment of claim 3, further comprising a control device coupled to the film removing mechanism, wherein:
the control device is configured for controlling the movable assembly to move the first suction nozzle according to the height of the protective film, such that the first suction nozzle is positioned to remove the protective film from the workpiece.

6. The assembling equipment of claim 2, wherein the film removing mechanism comprises a clamp assembly connected to the movable assembly, the clamp assembly comprises:
a clamp driver arranged on the movable assembly; the clamp driver being coupled to the control device, and the clamp driver comprising a motion end that is movable relative to the movable assembly; and
a clamp connected to the clamp driver at the motion end, the clamp being driven by the clamp driver to cooperate with the suction nozzle to clamp or release the protective film, wherein
the control device controls the movable assembly to move the suction nozzle and the clamp, such the suction nozzle and the clamp are positioned to remove that the protective film from the workpiece.

7. The assembling equipment of claim 5, wherein the detection assembly comprises:
a height detector coupled to the control device and configured for obtaining a height position of the protective film, the height detector being located near the suction nozzle, wherein
the control device controls the movable assembly to drive the suction nozzle towards the workpiece according to the height position of the protective film.

8. The assembling equipment of claim 7, wherein the detection assembly comprises:
a visual detector coupled to the control device, the visual detector being configured for obtaining the planar position of the protective film, wherein:
the control device controls the movable assembly to drive the suction nozzle, according to the height position and the planar position of the protective film, to be positioned to separate the protective film from the workpiece.

9. The assembling equipment of claim 8, wherein the detection assembly comprises:
a sensor coupled to the control device, the sensor being configured for obtaining conveying information of the conveying mechanism, wherein:
the control device controls the movable assembly to drive the suction nozzle, according to the height position of the protective film and the conveying information of the conveying mechanism, to be positioned to separate the protective film from the workpiece.

10. The assembling equipment of claim 1, wherein the second attaching mechanism comprises:
a transfer assembly configured for picking up a second component and moving the second component between a third position and a fourth position, wherein at the third position, the transfer assembly picks up the second component, and at the fourth position, the transfer assembly attaches the second component to the workpiece or removes the second component from the workpiece.

11. The assembling equipment of claim 10, further comprising another detection assembly and a control device,
wherein the another detection assembly is configured for detecting a pose of the first component;
the control device is coupled to the transfer assembly and the another detection assembly, the control device controls the transfer assembly to adjust the second component according to the pose of the first component detected by the another detection assembly, such that the transfer assembly is positioned to attach the second component to the workpiece at a portion corresponds to the first component.

12. The assembling equipment of claim 10, wherein the control device controls the positioning assembly to adjust the first component according to the pose of the first component detected by the another detection assembly, such that the transfer assembly is positioned to attach the second component to the workpiece at a portion corresponding to the first component.

13. The assembling equipment of claim 12, wherein the another detection assembly comprises:
a first photographing device coupled to the control device, the first photographing device being arranged at a side of the first component on the workpiece away from the positioning assembly, and configured for acquiring a first image of the second component and the first component on the workpiece at the fourth position; wherein
the control device controls the second transfer assembly to adjust the pose of the second component or controls the positioning assembly to adjust the pose of the first component according to the first image.

14. The assembling equipment of claim 13, wherein the another detection assembly further comprises:
a second photographing device coupled to the control device, the second photographing device being arranged at a side of the first component on the workpiece near the positioning assembly, and configured for acquiring a second image of the second component and the first component on the workpiece at the fourth position; wherein:
the control device controls the second transfer assembly to adjust the pose of the second component or controls the positioning assembly to adjust the pose of the first component according to the first image and the second image.

15. An assembling equipment comprising:
a platform comprising a first station, a second station, a third station, and a fourth station;
a conveying mechanism arranged on the platform;
a positioning assembly arranged on the conveying mechanism, the positioning assembly positioning a workpiece, the conveying mechanism moving the positioning assembly to the first station, the second station, the third station and the fourth station in sequence;
a first attaching mechanism arranged at the first station, the first attaching mechanism picking up and attaching a first component with a protective film to the workpiece carried by the positioning assembly after the positioning assembly is moved to the first station;
a film removing mechanism arranged at the second station, the film removing mechanism removing the protective film from the workpiece after the positioning assembly is moved to the second station;
a second attaching mechanism arranged at the third station, the second attaching mechanism picking up and attaching a second component to the first component on the workpiece to be connected together after the positioning assembly is moved to the third station; and
a pressure retaining and detecting module arranged at the fourth station, wherein the pressure retaining and detecting module retains a predetermined pressure of pressing the second component against the workpiece, and detects the attaching of the second component.

16. The assembling equipment of claim 15, wherein the film removing mechanism comprises
a suction nozzle configured for sucking the protective film on the first component; and
a clamp assembly comprising:
a clamp driver;
a clamp connected to the clamp driver for being driven by the clamp driver to cooperate with the suction nozzle to clamp the protective film.

17. The assembling equipment of claim 16, wherein the clamp assembly further comprises a mounting plate, the suction nozzle and the clamp driver are both mounted on a mounting plate, the clamp is pivotally mounted to the mounting plate, the clamp driver pivots the clamp relative to the mounting plate.

18. The assembling equipment of claim 16, further comprising a vibration plate, wherein the vibration plate feeds the second components to the second attaching mechanism.

19. The assembling equipment of claim 18, wherein the vibration plate comprises a vibrating member and a loading section, the vibrating member vibrates the second components to the loading section, the second attaching mechanism picks up the second components from the loading section.

* * * * *